(12) United States Patent
Tang et al.

(10) Patent No.: US 9,154,542 B2
(45) Date of Patent: Oct. 6, 2015

(54) METHOD AND SYSTEM OF FILE FOLDER TRANSMISSION IN INSTANT MESSAGING

(75) Inventors: Jingxiong Tang, Hangzhou (CN); Ming Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 631 days.

(21) Appl. No.: 13/503,471

(22) PCT Filed: Feb. 10, 2012

(86) PCT No.: PCT/US2012/024716
§ 371 (c)(1),
(2), (4) Date: Apr. 23, 2012

(87) PCT Pub. No.: WO2012/161761
PCT Pub. Date: Nov. 29, 2012

(65) Prior Publication Data
US 2012/0290667 A1    Nov. 15, 2012

(30) Foreign Application Priority Data

Feb. 24, 2011    (CN) .......................... 2011 1 0045735

(51) Int. Cl.
  *H04L 12/64* (2006.01)
  *H04L 29/08* (2006.01)
  *H04L 12/58* (2006.01)

(52) U.S. Cl.
  CPC ............ *H04L 67/06* (2013.01); *H04L 12/6418* (2013.01); *H04L 51/04* (2013.01); *H04L 51/08* (2013.01)

(58) Field of Classification Search
  CPC ...... H04L 12/6418; H04L 51/08; H04L 67/06

USPC .......................................................... 709/206
See application file for complete search history.

(56) References Cited

U.S. PATENT DOCUMENTS

| | | | | |
|---|---|---|---|---|
| 8,369,824 | B2 * | 2/2013 | Bakker et al. | 455/404.1 |
| 8,442,479 | B2 * | 5/2013 | Bakker et al. | 455/404.1 |
| 8,478,226 | B2 * | 7/2013 | Bakker et al. | 455/404.2 |
| 8,755,765 | B2 * | 6/2014 | Bakker et al. | 455/404.1 |

(Continued)

FOREIGN PATENT DOCUMENTS

| | | |
|---|---|---|
| CN | 101547161 | 9/2009 |
| CN | 102025515 | 4/2011 |

OTHER PUBLICATIONS

Extended European Search Report mailed Jul. 25, 2014 for European patent application No. 12789717.1, 6 pages.

(Continued)

*Primary Examiner* — Jimmy H Tran
(74) *Attorney, Agent, or Firm* — Lee & Hayes, PLLC

(57) ABSTRACT

File folder transmission in instant messaging may be implemented by an instant receiving client, which receives information of a file folder and information of each file in the file folder. The instant receiving client may display the information of the file folder and the information of each file in the file folder. In some embodiments, the instant receiving client may further receive selection information inputted by a user, and receive the files in the file folder that correspond to the selection information from an instant sending client. Such file folder transmission in instant messaging can efficiently save network resources within a process of file folder transmission.

17 Claims, 7 Drawing Sheets

(56) References Cited

U.S. PATENT DOCUMENTS

| | | | |
|---|---|---|---|
| 8,819,243 B1* | 8/2014 | Cope et al. | 709/227 |
| 8,868,687 B2* | 10/2014 | Drope | 709/219 |
| 8,964,764 B2* | 2/2015 | Drope | 370/400 |
| 2001/0021159 A1* | 9/2001 | Aratani | 369/95 |
| 2003/0014477 A1* | 1/2003 | Oppenheimer et al. | 709/203 |
| 2004/0199514 A1* | 10/2004 | Rosenblatt et al. | 707/10 |
| 2005/0223073 A1* | 10/2005 | Malik | 709/206 |
| 2006/0031560 A1* | 2/2006 | Warshavsky et al. | 709/232 |
| 2006/0095531 A1* | 5/2006 | Cho | 709/207 |
| 2007/0005707 A1 | 1/2007 | Teodosiu et al. | |
| 2007/0050624 A1* | 3/2007 | Lord et al. | 713/168 |
| 2007/0100888 A1 | 5/2007 | Kim et al. | |
| 2007/0124737 A1* | 5/2007 | Wensley et al. | 719/314 |
| 2007/0168431 A1* | 7/2007 | Lyle et al. | 709/206 |
| 2007/0203917 A1* | 8/2007 | Du et al. | 707/10 |
| 2009/0198780 A1* | 8/2009 | Koch | 709/206 |
| 2010/0050092 A1* | 2/2010 | Williams et al. | 715/753 |
| 2010/0211599 A1 | 8/2010 | Cao | |
| 2011/0029619 A1* | 2/2011 | Bai | 709/206 |
| 2011/0113122 A1* | 5/2011 | Drope | 709/219 |
| 2011/0219397 A1* | 9/2011 | Drope | 725/31 |
| 2011/0276637 A1* | 11/2011 | Thornton et al. | 709/206 |
| 2012/0166549 A1 | 6/2012 | Liu et al. | |
| 2012/0173629 A1* | 7/2012 | Drope | 709/204 |
| 2012/0233652 A1* | 9/2012 | Drope | 725/114 |
| 2013/0275478 A1 | 10/2013 | Bai | |
| 2015/0020093 A1* | 1/2015 | Drope | 725/31 |

OTHER PUBLICATIONS

PCT Search Report mailed May 30, 2012 for PCT application No. PCT/US12/24716, 8 pages.

Translation of the Chinese office Action mailed Mar. 21, 2014 for Chinese patent application No. 201110045735.2, a counterpart application of U.S. Appl. No. 13/503,471, 8 pages.

* cited by examiner

METHOD AND SYSTEM OF FILE FOLDER TRANSMISSION IN INSTANT MESSAGING

CROSS REFERENCE TO RELATED PATENT APPLICATIONS

This application is a national stage application of an international patent application PCT/US12/24716, filed Feb. 10, 2012, which claims priority to Chinese Patent Application No. 201110045735.2, filed Feb. 24, 2011, entitled "Method and System of File Folder Transmission and Instant Receiving Client in Instant Messaging," which applications are hereby incorporated by reference in their entirety.

TECHNICAL FIELD

The present disclosure relates to the field of data transmission, and more particularly, relates to methods and systems for folder transmission in instant messaging, and instant receiving clients.

BACKGROUND OF THE DISCLOSURE

A process of file transmission in instant messaging products may include a process of transmitting a file folder, which a receiving party may, however, only be allowed to choose to either accept all or reject all.

In existing technologies, a file folder transmission method generally includes the following procedures:

A sending party sends a file folder to a receiving party.

The receiving party sees a name of the file folder sent from the sending party.

After the receiving party agrees to receive the file folder, content of the file folder of the sending party is explored, and is subsequently transmitted to the receiving party one file after another, until all the files have been completely sent.

In the above method, the receiving party can only obtain information of the name of the file folder at the time of receiving. Further, the receiving party is only allowed to choose either accepting all or rejecting all, thus incurring a lot of inconvenience to users. Moreover, because all the files in the file folder are transmitted as network data during the process of file folder transmission, a huge amount of network data needs to be transmitted. As a result, a relatively large network bandwidth will be occupied, thus causing network congestion and wasting of network resources.

SUMMARY OF THE DISCLOSURE

The present disclosure aims to provide a method and a system for file folder transmission in instant messaging and instant receiving clients, in order to solve the problem of severe waste of network resources when transmitting a file folder in an instant messaging process.

In order to achieve the aforementioned goals, according to a first aspect of the present disclosure, a method of file folder transmission in instant messaging is provided. In one embodiment, an instant receiving client may receive information of a file folder and information of each file in the file folder. The instant receiving client may display the information of the file folder and the information of each file in the file folder. In some embodiments, the instant receiving client may further receive selection information inputted from a user. The selection information may include information of files in the file folder that are selected by the user. In one embodiment, the instant receiving client may receive the files in the file folder that correspond to the selection information.

Additionally, in some embodiments, before the instant receiving client receives the information of the file folder and the information of each file in the file folder, an instant sending client may explore the file folder that is to be sent to obtain the information of the file folder and the information of each file in the file folder. The instant sending client may send the information of the file folder and the information of each file in the file folder to the instant receiving client simultaneously.

Additionally or alternatively, in one embodiment, in response to receiving the selection information inputted from the user, the instant receiving client may send a file list corresponding to the selection information to the instant sending client. The instant sending client may send the files corresponding to the file list to the instant receiving client.

Additionally or alternatively, in response to receiving the files in the file folder that correspond to the selection information, the instant receiving client may provide a prompt as to whether to continue receiving other files in the file folder that are different from the received files.

Furthermore, after the instant receiving client has provided the prompt as to whether to continue receiving the other files in the file folder that are different from the received files, if the user chooses to continue receiving the other files in the file folder that are different from the received files, the instant receiving client may send a remaining file list that corresponds to the other files in the file folder that are different from the received files to the instant sending client. The instant sending client may send files corresponding to the remaining file list to the instant receiving client.

Additionally or alternatively, in some embodiments, the instant receiving client may further receive information of an order of file transmission that is inputted by the user. The instant receiving client may therefore receive each file in the file folder according to the information of the order of file transmission.

In order to achieve the aforementioned goals, according to a second aspect of the present disclosure, a method of file folder transmission in instant messaging is further provided. In one embodiment, an instant sending client may explore a file folder that is to be sent to obtain information of the file folder and information of each file in the file folder. The instant sending client may send the information of the file folder and the information of each file in the file folder to the instant receiving client. In some embodiments, the instant sending client may further receive information of files in the file folder that are selected by a user from the instant receiving client, and may send files in the file folder that correspond to the selection information to the instant receiving client.

In order to achieve the aforementioned goals, according to a third aspect of the present disclosure, an instant receiving client is provided. The instant receiving client may include a first receiving module configured to receive information of a file folder and information of each file in the file folder. Additionally, the instant receiving client may further include a display module configured to display the information of the file folder and the information of each file in the file folder. In some embodiments, the instant receiving client may further include a second receiving module configured to receive selection information inputted by a user. The selection information may include information of files in the file folder that are selected by the user. In one embodiment, the instant receiving client may additionally include a third receiving module configured to receive the files in the file folder that correspond to the selection information.

Additionally or alternatively, in some embodiments, the instant receiving client may further include a fourth receiving module configured to receive information of an order of file transmission that is inputted by the user. In one embodiment, the third receiving module is further configured to receive each file in the file folder according to the information of the order of file transmission.

In order to achieve the aforementioned goals, according to a fourth aspect of the present disclosure, a system for file folder transmission in instant messaging is provided. The file folder transmission system may include an instant sending client and an instant receiving client. In one embodiment, the instant sending client may be configured to obtain information of a file folder and information of each file in the file folder. The instant receiving client may be configured to receive and display the information of the file folder and the information of each file in the file folder. In some embodiments, the instant receiving client may further be configured to receive selection information inputted by a user, and receive files in the file folder that correspond to the selection information. In one embodiment, the selection information may include, for example, information of the files in the file folder that are selected by the user.

Additionally or alternatively, the instant receiving client is further configured to provide a prompt as to whether to continue receiving files other than the received files in the file folder. In some embodiments, the instant sending client is further configured to send the files other than the received files in the file folder to the instant receiving client if the user chooses to continue receiving the files other than the received files in the file folder.

By using an instant receiving client to receive information of a file folder and information of each file in the file folder, display the information of the file folder and the information of each file in the file folder, receive selection information inputted by the user, and receive files in the file folder that correspond to the selection information, the disclosed method and system allow the instant receiving client to receive only the files that are selected by the user without receiving all the files in the entire file folder. This resolves the problem of wasting of network resources during a file folder transmission in an instant messaging process, and therefore achieves an effect of efficient saving of network resources during the file folder transmission.

BRIEF DESCRIPTION OF THE DRAWINGS

Accompanying figures that constitute a part of the present disclosure are used to provide further understanding of the present disclosure. Exemplary embodiments and respective descriptions in the present disclosure are intended to describe the exemplary embodiments, and should not be construed as limitations to the present disclosure.

DETAILED DESCRIPTION

It should be noted that exemplary embodiments and characteristics in the exemplary embodiments of the present disclosure may be combined with each other under non-conflicting circumstances. The present disclosure is described in detail below using the accompanying figures and exemplary embodiments.

Figure 1:
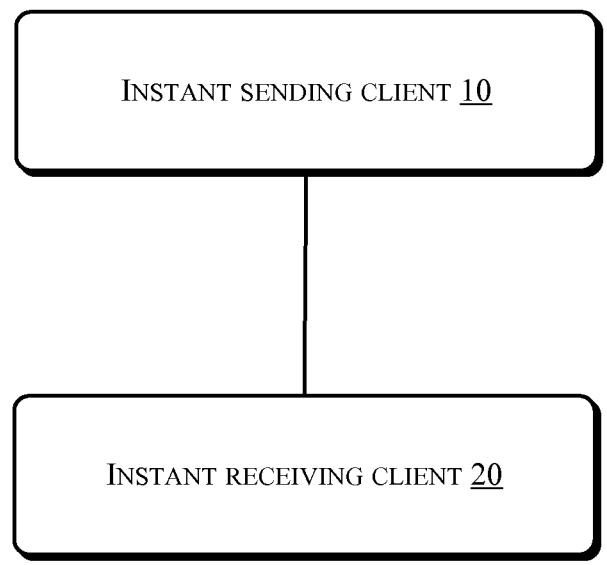
FIG. 1 shows a schematic diagram of a system of file folder transmission in accordance with an exemplary embodiment of the present disclosure.

FIG. 1 is a schematic diagram of a system of file folder transmission in accordance with an exemplary embodiment of the present disclosure.

As shown in FIG. 1, the file folder transmission system includes an instant sending client 10 and an instant receiving client 20.

In one embodiment, the instant sending client 10 may be configured to obtain information of a file folder and information of each file in the file folder. For example, the instant sending client 10 may obtain the information of the file folder and the information of each file in the file folder through direct acquisition from a local computer or server where it is located, or through acquisition from a server or computer that is connected with the computer where it is located. The instant receiving client 20 may be configured to receive and display the information of the file folder and the information of each file in the file folder from the instant sending client 10. In some embodiments, the instant receiving client 20 may further be configured to receive selection information inputted by a user, and receive file(s) in the file folder that correspond(s) to the selection information. The selection information may include, for example, information of file(s) in the file folder that is/are selected by the user. In some embodiments, the instant receiving client 20 and the instant sending client 10 may communicate with each other through wireless communication or wired communication.

In one embodiment, the information of the file folder and the information of each file in the file folder that is obtained by the instant sending client 10 may include, but is not limited to, a name of the file folder, a respective name and a respective size of each file in the file folder, etc.

The instant receiving client 20 may first receive only information of a file folder to be sent and information of each file in the file folder. The instant receiving client 20 may then display the received information to a user for selection of file(s) that is/are desired by the user. The instant receiving client 20 may further receive selection information inputted by the user, and send a file folder list corresponding to the selection information to the instant sending client 10. In response to receiving the selection information, the instant sending client 10 may send the file(s) desired by the user to the instant receiving client 20, and therefore is allowed to transmit only the file(s) that is/are desired by the user, thus facilitating operations of the user and efficiently saving network resources during the process of file folder transmission.

In one embodiment, the instant receiving client 20 is further configured to provide a prompt as to whether to continue receiving files in the file folder that are other than the received file(s). Moreover, the instant sending client 10 is further configured to send the files other than the received file(s) in the file folder to the instant receiving client 20 if the user chooses to continue receiving the files other than the received file(s) in the file folder. In some situations, upon completion of the transmission of the file(s) desired by the user, the user may want to obtain remaining files in the file folder. At that time, allowing the instant receiving client 20 to provide a prompt to the user if he/she wants to transmit the remaining files may greatly facilitate operations of the user.

Prior to receiving the information of the file folder and the information of each file in the file folder by the instant receiving client 10, the instant sending client 10 may further be configured to explore the file folder that is to be sent to obtain the information of the file folder and the information of each file in the file folder. The instant sending client 10 may send the information of the file folder and the information of each file in the file folder to the instant receiving client 20 simultaneously. Sending the information of the file folder and the information of each file in the file folder to the instant receiving client 20 simultaneously allows the instant receiving client 20 to obtain and display the information of the file folder and the information of each file in the file folder at the same time, thus facilitating the user to select file(s) that is/are desired.

In one embodiment, after the instant receiving client 20 has received the selection information inputted by the user, the instant receiving client 20 may further be configured to send a file list corresponding to the selection information to the instant sending client 10. The instant sending client 10 may send the file(s) corresponding to the file list to the instant receiving client. Since the instant sending client 10 transmits file(s) based on the received file list, i.e., transmitting only the file(s) found in the file list, unnecessary file transmission is therefore avoided. This therefore efficiently saves network resources and improves transmission speed.

Figure 2:
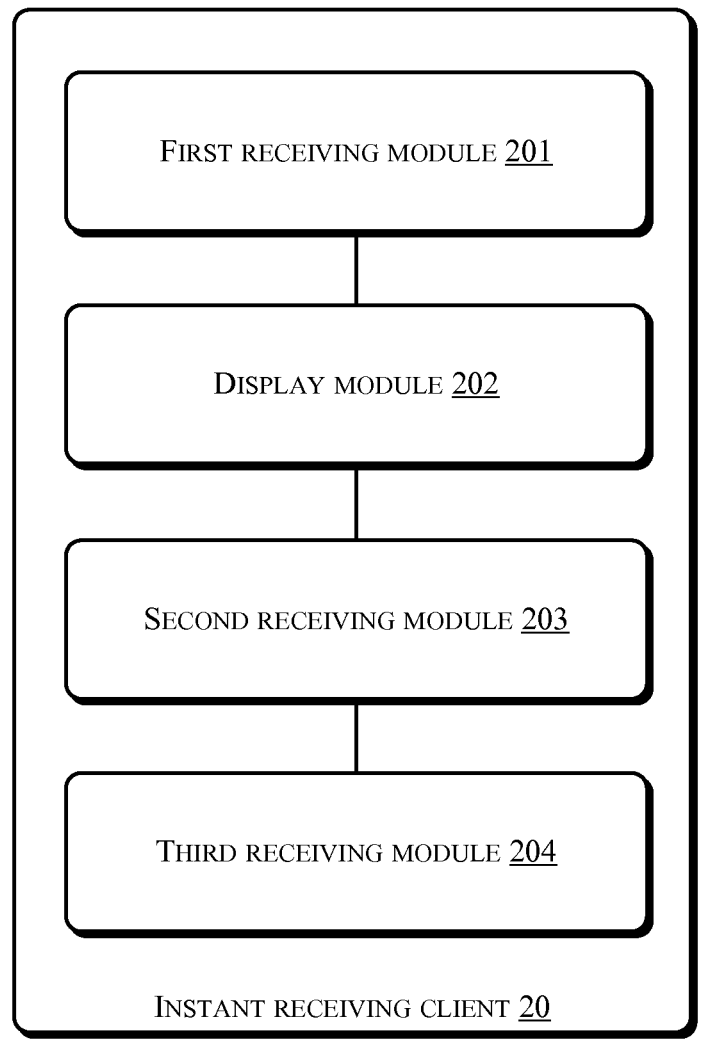
FIG. 2 shows a schematic diagram of an instant receiving client in accordance with an exemplary embodiment of the present disclosure.

FIG. 2 is a schematic diagram of an instant receiving client in accordance with an exemplary embodiment of the present disclosure.

As shown in FIG. 2, the instant receiving client 20 includes a first receiving module 201, a display module 202, a second receiving module 203, and a third receiving module 204.

The first receiving module 201 receives information of a file folder and information of each file in the file folder. The display module 202 may display the information of the file folder and the information of each file in the file folder. In some embodiments, the second receiving module 203 may receive selection information inputted by a user. The selection information may include information of files in the file folder that are selected by the user, for example. The third receiving module 204 may receive the files in the file folder that correspond to the selection information.

The instant receiving client 20 first receives only information of a file folder to be sent and information of each file in the file folder, and then displays the received information to a user for selecting file(s) that is/are desired by the user. The instant receiving client 20 may further receive selection information inputted by the user, and receive a file folder corresponding to the selection information. Therefore, only the file(s) desired by the user is/are transmitted, thus reducing unnecessary file transmission and efficiently saving network resources.

Figure 3:
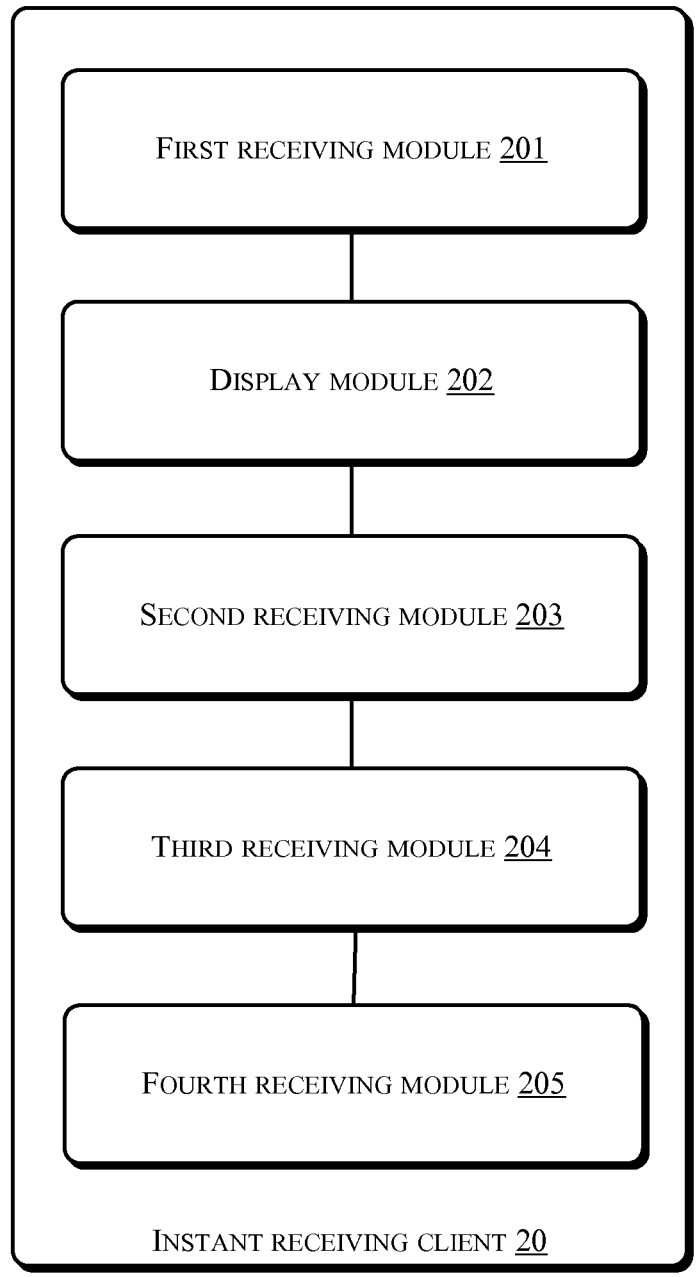
FIG. 3 shows a schematic diagram of an instant receiving client in accordance with an exemplary embodiment of the present disclosure.

FIG. 3 is a schematic diagram of an instant receiving client in accordance with an exemplary embodiment of the present disclosure.

As shown in FIG. 3, in addition to the first receiving module 201, the display module 202, the second receiving module 203 and the third receiving module 204, the instant receiving client 20 further includes a fourth receiving module 205.

In one embodiment, the first receiving module 201 is configured to receive information of a file folder and information of each file in the file folder. The display module 202 may display the information of the file folder and the information of each file in the file folder. Furthermore, the second receiving module 203 may be configured to receive selection information inputted by a user, where the selection information corresponds to information of files in the file folder that are selected by the user. In one embodiment, the third receiving module 204 is configured to receive the files in the file folder that correspond to the selection information. In some embodiments, the fourth receiving module 205 may receive information of an order of file transmission that is inputted by the user. The third receiving module 204 may further be configured to receive each file in the file folder according to the information of the order of file transmission.

The instant receiving client 20 first receives the information of the order of file transmission that has been inputted by the user, and perform receiving according to a file folder order desired by the user, thereby ascertaining the order of receiving files based on the needs of the user. In one embodiment, the instant receiving client 20 performing receiving according to the file folder ordering desired by the user may be implemented as follows: the instant receiving client 20 receives file transmission order information that is inputted by the user and sends the file transmission order information to the instant sending client 10. The instant sending client 10 may then send the files in the file folder according to the file transmission order information. Through sending files from the instant sending client end according to an order desired by the user, file transmission of the files can be totally controlled according to the needs of the user, thus maximally saving the network resources.

Figure 4:
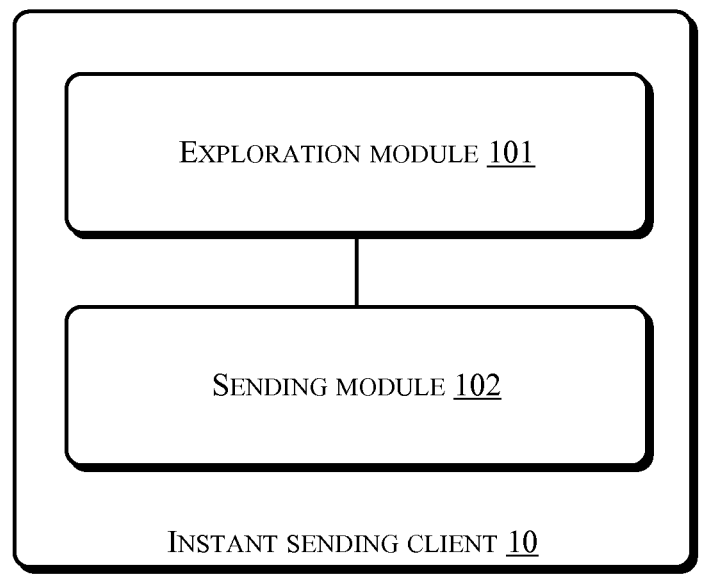
FIG. 4 shows a schematic diagram of an instant sending client in accordance with an exemplary embodiment of the present disclosure.

FIG. 4 is a schematic diagram of an instant sending client in accordance with an exemplary embodiment of the present disclosure.

As shown in FIG. 4, the instant sending client 10 includes an exploration module 101 and a sending module 102.

In one embodiment, the exploration module 101 may be configured to explore a file folder to be transmitted to obtain information of the file folder and information of each file in the file folder. The sending module 102 may be configured to send the information of the file folder and the information of each file in the file folder to the instant receiving client 20. By sending the information of the file folder and the information of each file in the file folder to the instant receiving client 20, the instant receiving client 20 is allowed to obtain and display the information of the file folder and the information of each file in the file folder simultaneously, thus facilitating a user to select his/her desired files.

It should be noted that, for the sake of description, the above apparatuses are described separately in terms of individual units based on respective functions. When implementing the present disclosure, functions of each unit may be implemented in one or more software and/or hardware components. Specifically, the instant sending client 10 and the instant receiving client 20 may be implemented using hardware or instant messaging software.

Figure 5:
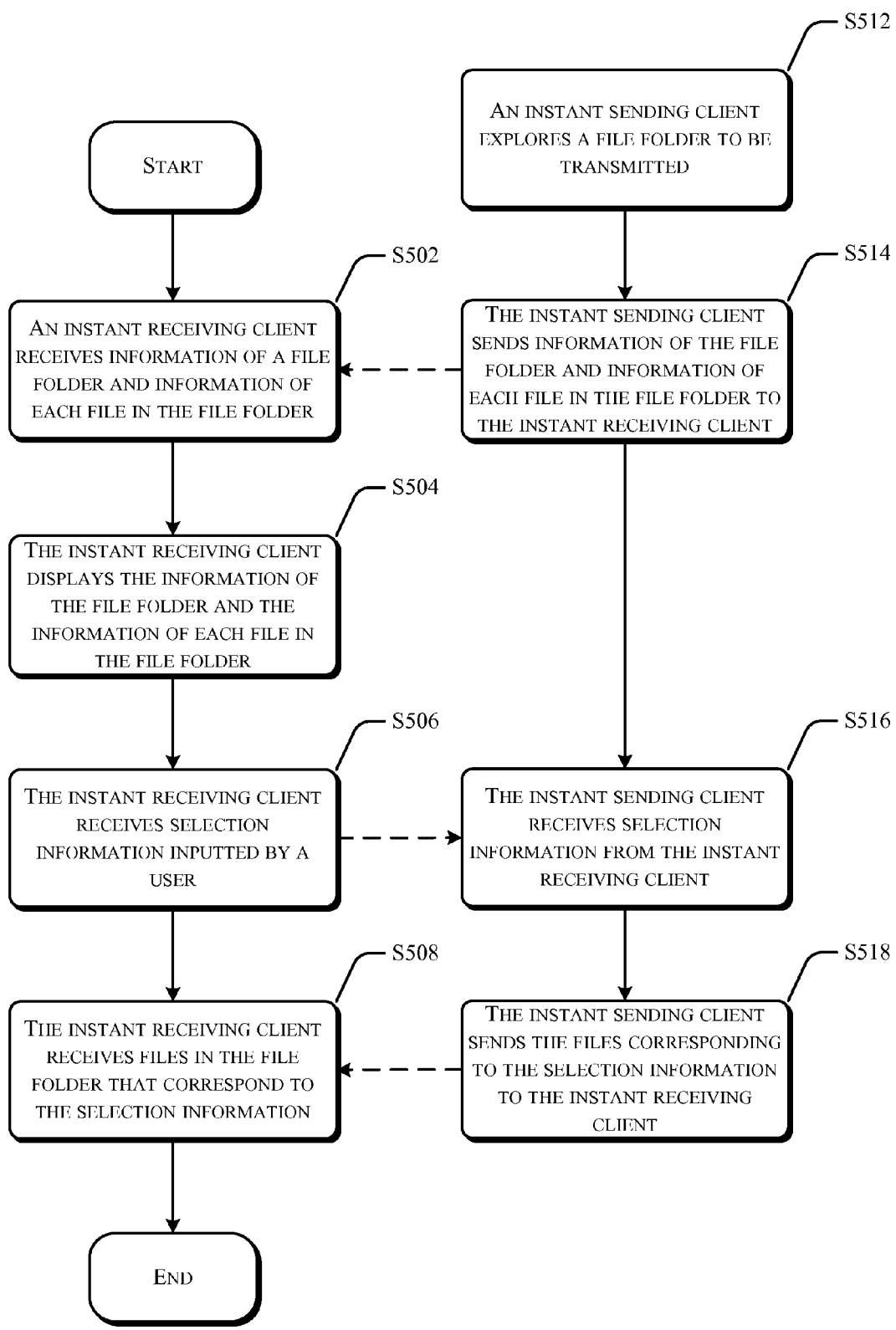
FIG. 5 shows a flowchart of a method for file folder transmission in accordance with an exemplary embodiment of the present disclosure.

FIG. 5 is a flowchart of a method of file folder transmission in accordance with an exemplary embodiment of the present disclosure.

As shown in FIG. 5, the method of file folder transmission includes the following blocks.

At block S502, the instant receiving client 20 receives information of a file folder and information of each file in the file folder.

At block S504, the instant receiving client 20 displays the information of the file folder and the information of each file in the file folder.

At block S506, the instant receiving client 20 receives selection information inputted by the user. The selection information corresponds to information associated with files in the file folder that are selected by the user.

At block S508, the instant receiving client 20 receives the files in the file folder that correspond to the selection information.

In this exemplary embodiment, the instant receiving client 20 is allowed to first receive only information of a file folder to be transmitted and information of each file in the file folder to be transmitted, display the received information to a user for the user to select desired file(s) to be received, receive selection information inputted by the user, and receive a file folder corresponding to the selection information. As such, only the file(s) that is/are desired by the user is/are transmitted, thus reducing unnecessary file transmission and effectively saving network resources.

Furthermore, in one embodiment, the instant receiving client 20 may receive information of an order of file transmission inputted by the user. In this case, receiving the files in the file folder that correspond to the selection information includes: the instant receiving client 20 receiving each file in the file folder according to the information of the order of file transmission. Through this exemplary embodiment, the instant receiving client 20 may first receive information of an order of file transmission inputted by the user, and then receive each file in the file folder according to the information of the order of file transmission, thereby permitting a determination of an order of receiving files according to the needs of the user. Furthermore, the instant receiving client 20 performing receiving according to the file folder ordering desired by the user may be implemented using the following method: the instant receiving client 20 receiving information of an order of file transmission inputted by the user and sending the information of the order of file transmission to the instant sending client 10, and the instant sending client sending the files in the file folder according to the information of the order of file transmission. Through sending files by the instant sending client end according to an order desired by the user, file transmission of the files can be completely controlled based on the needs of the user, thus maximally saving network resources.

In one embodiment, prior to receiving the information of the file folder and the information of each file in the file folder by the instant receiving client 20, the instant sending client 10 may explore the file folder to be transmitted to obtain the information of the file folder and the information of each file in the file folder. The instant sending client 10 may send the information of the file folder and the information of each file in the file folder to the instant receiving client 20 simultaneously. At that time, the instant receiving client 20 may display as much information as possible simultaneously for facilitating the receiving user to make a selection based on understanding of as much information as possible.

In some embodiments, after the instant receiving client 20 has received the selection information inputted by the user, the instant receiving client 20 may further send a file list corresponding to the selection information to the instant sending client 10. In response to receiving the file list, the instant sending client 10 may send files corresponding to the file list to the instant receiving client 20. By allowing the instant sending client 10 to find files corresponding to the file list based on the received file list that corresponds to the selection information and send the files corresponding to the file list to the instant receiving client 20, the instant sending client 10 is enabled to search for the files that need to be transmitted quickly.

Additionally or alternatively, after the instant receiving client 20 has received the files in the file folder that correspond to the selection information, the instant receiving client 20 may provide a prompt as to whether to continue receiving files in the file folder other than the received files. By setting up a prompt, if the user wants to receive files in the file folder that are other than the received files, the user may directly perform an operation according to the prompt to receive remaining files, thus providing convenience to the user.

In one embodiment, after the instant receiving client 20 has provided the prompt as to whether to continue receiving the files in the file folder other than the received files, if the user chooses to continue receiving the files in the file folder other than the received files, the instant receiving client 20 may send a remaining file list that corresponds to the files in the file folder other than the received files to the instant sending client 10. In response to receiving the remaining file list, the instant sending client 10 may send files that correspond to the remaining file list to the instant receiving client 20. By allowing the instant sending client 10 to find files based on the file list of remaining files and send the files corresponding to the file list of remaining files to the instant receiving client 20, the instant sending client 10 is enabled to search for files that are desired but have not been transmitted quickly.

According to the exemplary embodiment of the present disclosure, a method of file folder transmission during instant messaging is further provided, which includes the following blocks.

At block S512, the instant sending client explores a file folder to be transmitted to obtain information of the file folder and information each file in the file folder.

At block S514, the instant sending client sends the information of the file folder and the information of each file in the file folder to the instant receiving client.

At block S516, the instant sending client receives information about files in the file folder that have been selected by the user from the instant receiving client.

At block S518, the instant sending client sends the files in the file folder that correspond to the selection information.

In this exemplary embodiment, by allowing the instant sending client to explore the file folder to be transmitted and send the information of the explored file folder and the information of each file in the file folder to the instant receiving client, the instant receiving client is allowed to display received information to the user upon receiving the information of the file folder to be transmitted and the information of each file in the file folder in order to allow the user to select desired files to be received and transmit only files that correspond to the selection information. Therefore, this exemplary embodiment allows transmitting only the files that are desired by the user, thus reducing unnecessary file transmission and effectively saving network resources.

Figure 6:
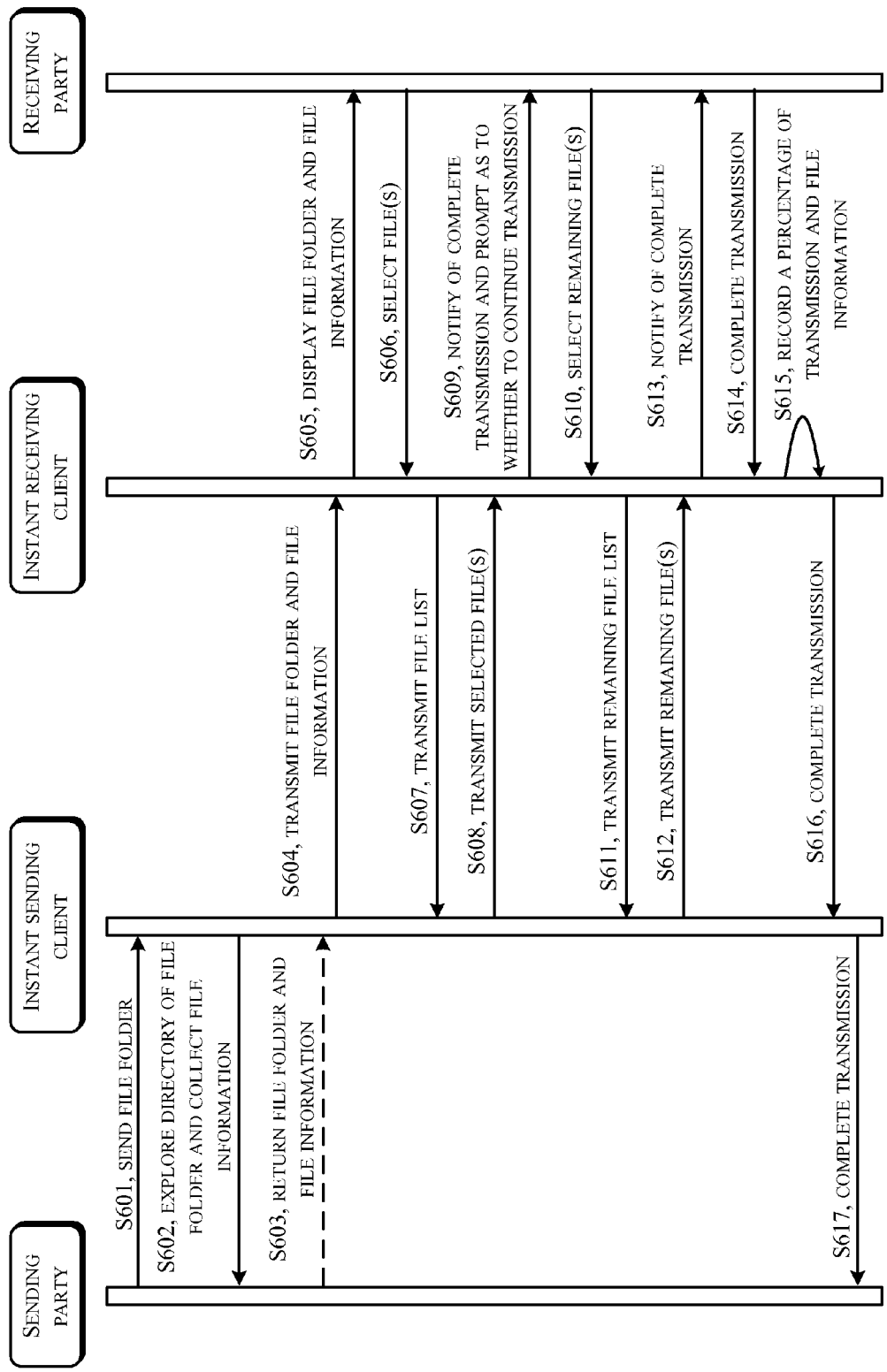
FIG. 6 shows a flowchart of a method for file folder transmission in accordance with an exemplary embodiment of the present disclosure.

FIG. 6 is a flowchart of a method of file folder transmission in accordance with an exemplary embodiment of the present disclosure.

In this figure, a sending party corresponds to a user who initiates transmission of a file folder (including a local computing device or server of the sending party). A receiving party corresponds to a user who receives the transmitted file folder (including a local computing device or server of the receiving party). An instant sending client may be the instant sending client 10 that is described in any one of the foregoing exemplary embodiments. An instant receiving client may be the instant receiving client 20 that is described in any one of the foregoing exemplary embodiments. As shown in FIG. 6, the method includes the following blocks.

At block S601, the sending party performs operations in his/her local computing device to cause the computing device to send a file folder for the instant sending client. Alternatively, the instant sending client receives information of operations inputted by the user and locally searches for a file folder to be transmitted based on the operations of the user.

At block S602, the instant sending client explores a directory of the file folder, collects file information, and obtains information of the file folder and information of each file in the file folder. The file information may include a file name, a file size, a file type, etc.

At block S603, the computing device or server of the sending party returns the information of the file folder and the files needed by the instant sending client to the instant sending client.

It should be noted that the information of the file folder and the information of all the files in the file folder may be returned from the computing device or server of the sending party to the instant sending client, or may be directly obtained by the instant sending client locally.

At block S604, the instant sending client sends the file folder information and the file information to the instant receiving client. For example, the instant sending client may transmit the file folder information and the file information to the instant receiving client through the P2P technology, for example.

At block S605, the instant receiving client displays the folder information and the file information to the receiving party. For example, the instant receiving client may present a list to the receiving party using a list control. The list includes a name of the file folder, and a name, a size and a type of each file in the file folder, etc.

In one embodiment, in response to receiving the information, the instant receiving client may first notify the receiving party of a file folder that is going to be transmitted. The receiving party sees a name of the file folder through the list control, and upon clicking on the list, may further see information of all the files in the file folder.

At block S606, after seeing the folder information and the file information, the receiving party selects desired file(s) in the file folder to be received. The receiving party may check and select his/her desired file(s) for transmission based on his/her needs, or check and select the name of the file folder to perform an entire transmission thereof.

At block S607, the instant receiving client sends a file list selected by the user to the instant sending client.

At block S608, the instant sending client sends the file folder and the files in the file folder selected by the user, i.e., files corresponding to the file list, to the instant receiving client. For example, after receiving the file list that needs to be transmitted, the files are transmitted according to an order until all the files that correspond to the file list are completely transmitted.

At block S609, the instant receiving client notifies the receiving party that the transmission has been completed, and provides a prompt as to whether to continue transmission, allowing the receiving party to select files and send a file list thereof for further transmission.

At block S610, the receiving party chooses to continue transmission, and selects files that are remained for transmission.

At block S611, the instant receiving client sends a remaining file list to the instant sending client.

At block S612, the instant sending client sends the remaining files to the instant receiving client.

At block S613, the instant receiving client notifies the receiving party that the file transmission has been completed.

At block 614, the receiving party ascertains that the transmission has been completed.

At block S615, the instant receiving client records a percentage of transmission and file information. By locally recording information of the file folder that has been transmitted, retransmission at a breakpoint may be performed.

At block S616, the instant receiving client sends a message indicating that the transmission is completed to the instant sending client.

At block S617, in response to receiving the message indicating that the transmission is completed, the instant sending client ends the transmission, and completes the transmission for the sending party.

In this exemplary embodiment, by improving the functionality of file folder transmission in existing instant messaging tools, the receiving party is allowed to see contents of a file folder concretely, and select file(s) that he/she truly needs for transmission and for adjustment of an order of transmission.

It should be noted that blocks shown in the flowcharts of accompanying figures may be executed using a series of computer-executable instructions of a computing system. Furthermore, although logical orders are shown in the flowcharts, blocks shown or described therein may be executed in orders different therefrom under certain situations.

The present disclosure provides a new technical scheme. Specifically, when initiating a file folder transmission, the sending party sends not only information of a file folder, but also information such as names, types and sizes of all files in the file folder to the receiving party. Moreover, the sending party further provides the receiving party an option of selecting to continue transmission and an option of retransmission at a breakpoint. As can be seen from the above description, the present disclosure has the following advantages:

1. Prior to receiving, the receiving party can thoroughly understand contents of the file folder, thus increasing the safety of transmission.

2. Autonomy of the user is manifested. The user can choose one or more files for transmission based on factors such as his/her preference and space, etc., thus saving network flow.

3. The user is allowed to select an order of file transmission based on his/her needs.

4. Individualized user experience with file folder transmission is provided.

From the above descriptions of the exemplary embodiments, one skilled in the art can clearly understand that the disclosed method and system may be implemented using software with essential universal hardware platform. Based on this understanding, the technical scheme of the present disclosure or contributions to existing technology may be implemented in the form of software products. The software products may be stored in a non-volatile storage media, e.g., ROM/RAM, disk, or compact disc, etc., and includes instructions for a computing device (e.g., a personal computer, a server or a networked device, etc.) to execute the method described in the exemplary embodiments or certain parts of the exemplary embodiments in the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary system has been described in a relatively simple manner because of its fundamental correspondence with the exemplary method. Details thereof can be referred to related portions of the exemplary method.

The disclosed method and system may be used in an environment or in a configuration of universal or specialized computer system(s). Examples include a personal computer, a server computer, a handheld device or a portable device, a tablet device, a multi-processor system, a microprocessor system, a set-top box, programmable consumer electronics, a network PC, a micro-computer, a macro-computer, and a distributed computing environment including any system or device above.

The disclosed method and system can be described in the general context of computer-executable instructions, e.g., program modules. Generally, the program modules can include routines, programs, objects, components, data structures, and the like that perform particular functions or implement particular abstract data types. The disclosed method and system can also be practiced in a distributed computing environment where functions are performed by remote processing devices that are linked through a communication network. In a distributed computing environment, the program modules may be located in local and/or remote computer storage media, including storage devices.

Apparently, one skilled in the art should understand that the modules or blocks in the present disclosure can be realized using general computing devices, and they can be concentrated in a single computing device, or distributed in networks made up of multiple computing devices. Optionally, they can be implemented using executable program codes in computing devices, and therefore can be stored in storage devices and executed by computing devices. Alternatively, they can be separately created into multiple integrated circuit modules, or various modules and blocks thereof can be combined to form a single integrated circuit module. In this way, the present disclosure is not limited to any specific combination of hardware and software.

Figure 7:
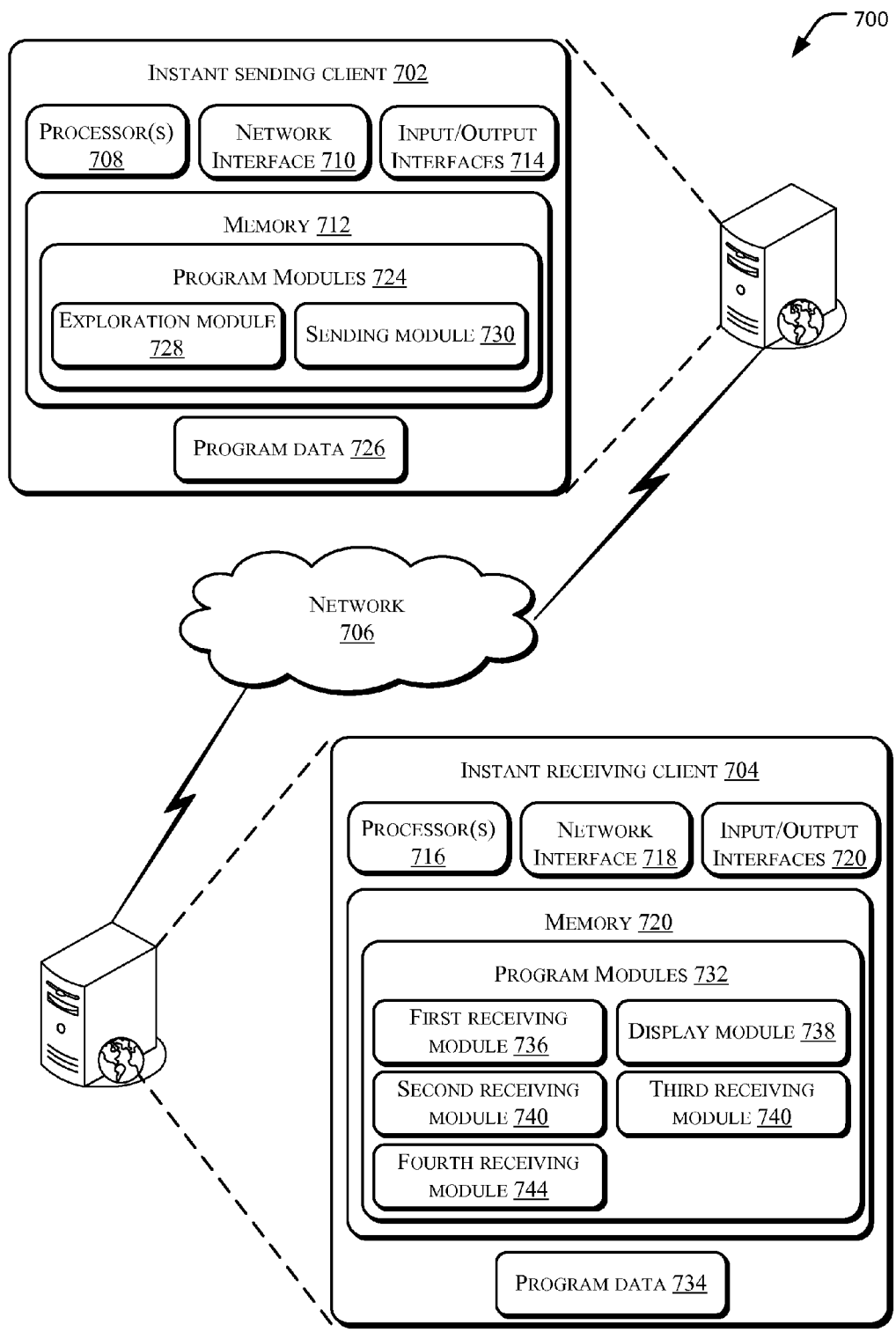
FIG. 7 shows the exemplary system described in FIG. 1 in more detail.

For example, FIG. 7 illustrates an exemplary system 700, such as the system as described above, in more detail. In one embodiment, the system 700 includes an instant sending client 702, an instant receiving client 704, and a network 706. The network may include, but is not limited to, a wireless communication network or a wired communication network.

The instant sending client 702 can include, but is not limited to, one or more processors 708, a network interface 710, memory 712, and an input/output interface 714.

The instant receiving client 704 can include, but is not limited to, one or more processors 716, a network interface 718, memory 720, and an input/output interface 722.

The memory 712 and the memory 720 may include computer-readable media in the form of volatile memory, such as random-access memory (RAM) and/or non-volatile memory, such as read only memory (ROM) or flash RAM. The memory 803 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

In one embodiment, the memory 712 of the instant sending client 702 may include program modules 724 and program data 726. In some embodiments, the program modules 724 may include an exploration module 728 and a sending module 730. Details about these program modules may be found in the foregoing embodiments described above.

In one embodiment, the memory 720 of the instant receiving client 704 may include program modules 732 and program data 734. In some embodiments, the program modules 732 may include a first receiving module 736, a display module 738, a second receiving module 740, a third receiving module 742 and a fourth receiving module 744. Details about these program modules may be found in the foregoing embodiments described above.

The foregoing exemplary embodiments are merely example embodiments of the present disclosure, and should not be construed as limitations of the present disclosure. For one skilled in the art, the present disclosure can be altered or modified in many different ways without departing from the spirit and the scope of this disclosure. Accordingly, it is intended that all modifications, equivalents and improvements, etc., which fall within the spirit and the scope of this disclosure, are covered within the protection scope of the present disclosure.

What is claimed is:

1. A method of transmitting a file folder in instant messaging, comprising:
under control of one or more processors configured with executable instructions:
receiving, at an instant receiving client, information of the file folder and information of each file in the file folder, the instant receiving client initiating the method;
displaying, by the instant receiving client, the information of the file folder and the information of each file in the file folder;
receiving, at the instant receiving client, selection information inputted by a user, wherein the selection information comprises information associated with selected files in the file folder that are selected by the user;
receiving, by the instant receiving client, the selected files in the file folder;
in response to receiving the selected files, providing, by the instant receiving client, a prompt as to whether to continue receiving additional files in the file folder, the additional files being different than the received selected files; and
transmitting a remaining file list from the instant receiving client, the remaining file list indicating the additional files in the file folder.

2. The method as recited in claim 1, wherein the information of the file folder and the information of each file in the file folder is simultaneously received at the instant receiving client, and wherein the information of the file folder and the information of each file in the file folder is simultaneously displayed by the instant receiving client.

3. The method as recited in claim 1, wherein upon receiving, at the instant receiving client, selection information inputted by the user, the method further comprises:
sending, by the instant receiving client, a file list corresponding to the selection information to an instant sending client, the instant sending client sending the file folder; and
receiving, by the instant receiving client, files corresponding to the file list from the instant sending client.

4. The method as recited in claim 1, wherein upon providing, by the instant receiving client, the prompt as to whether to continue receiving the additional files, the method further comprises:
- sending, by the instant receiving client, a remaining file list corresponding to the files in the file folder that are other than the received files to the instant sending client, if the user selects to continue receiving the files in the file folder that are other than the received files; and
- receiving, by the instant receiving client, files corresponding to the remaining file list from the instant sending client.

5. The method as recited in claim 1, further comprising receiving, by the instant receiving client, information of an order of file transmission inputted by the user.

6. The method as recited in claim 5, further comprising receiving, by the instant receiving client, the selected files in the file folder from an instant sending client according to the information of the order of file transmission.

7. The method as recited in claim 6, further comprising upon receiving the selected files in the file folder from the instant sending client, providing, at the instant receiving client, an option of selection for additional files to be received to the user.

8. The method as recited in claim 1, wherein displaying, by the instant receiving client, the information of the file folder and the information of each file in the file folder comprising displaying the information of the file folder and the information of each file in the file folder using a list control.

9. The method as recited in claim 8, wherein receiving, at the instant receiving client, selection information inputted by a user comprises receiving selection of names of the files displayed in the list control.

10. An apparatus for file folder transmission in an instant messaging system, the apparatus comprising:
- one or more processors;
- memory communicatively coupled to the one or more processors;
- a first receiving module stored in the memory and executable by the one or more processors that receives information of a file folder and information of each file in the file folder, the instant receiving client initiating reception of the file folder;
- a display module stored in the memory and executable by the one or more processors that displays the information of the file folder and the information of each file in the file folder;
- a second receiving module stored in the memory and executable by the one or more processors that receives selection information inputted by a user, the selection information comprising information associated with selected files in the file folder that are selected by the user; and
- a third receiving module stored in the memory and executable by the one or more processors that receives the files in the file folder that correspond to the selection information,
- wherein the apparatus is configured to provide a prompt to the user as to whether to continue receiving files in the file folder that are other than the received files corresponding to the selection information, and
- wherein the apparatus is configured to transmit a remaining file list indicating the files in the file folder other than the received files corresponding to the selection information.

11. The apparatus as recited in claim 10, further comprising a fourth receiving module stored in the memory and executable by the one or more processors that receives information of an order of file transmission inputted by the user, wherein the third receiving module is configured to receive the files in the file folder according to the information of the order of file transmission.

12. The apparatus as recited in claim 10, wherein the apparatus is further configured to send a remaining file list corresponding to the files in the file folder that are other than the received files to an instant sending client in response to receiving an input from the user to continue receiving the files in the file folder that are other than the received files.

13. The apparatus as recited in claim 10, wherein the files in the file folder that are selected by the user comprise less than all of files in the file folder.

14. One or more non-transitory computer storage media configured with computer-executable instructions that, when executed by one or more processors, configure the one or more processors to perform a method of transmitting a file folder from a sending party to a receiving party in instant messaging, the method initiated by an instant receiving client and, in response to receiving, at the instant sending client, the file folder to be sent to the instant receiving client, perform acts comprising:
- exploring, by the instant sending client, a file folder to be transmitted to obtain information of the file folder and information of each file in the file folder;
- sending, by the instant sending client, the information of the file folder and the information of each file in the file folder to the instant receiving client;
- receiving, at the instant sending client, selection information associated with files in the file folder that are selected by the user from the instant receiving client; and
- sending, by the instant sending client, the files in the file folder that correspond to the selection information; and
- sending, by the instant sending client, additional files being different than the sent files in the file folder that correspond to the selection information, based on receiving a remaining file list from the instant receiving client, the remaining file list indicating the additional files in the file folder desired by the user that are other than the sent files corresponding to the selection information.

15. The one or more non-transitory computer storage media as recited in claim 14, the acts further comprising, in response to receiving the selection information, searching, by the instant sending client, the selected files in the file folder in a computing device or server local to the instant sending client based on the selection information.

16. The one or more non-transitory computer storage media as recited in claim 14, the acts further comprising, in response to receiving the remaining file list, sending the additional files in the file folder that are other than the sent files corresponding to the selection information to the instant receiving client.

17. The one or more non-transitory computer storage media as recited in claim 14, wherein the information of each file in the file folder comprises a name, a type and/or a size of the respective file in the file folder.

* * * * *